United States Patent
Rastegar

(10) Patent No.: US 9,448,040 B2
(45) Date of Patent: Sep. 20, 2016

(54) REMOTELY GUIDED GUN-FIRED AND MORTAR ROUNDS

(71) Applicant: Jahangir S Rastegar, Stony Brook, NY (US)

(72) Inventor: Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 301 days.

(21) Appl. No.: 14/225,358

(22) Filed: Mar. 25, 2014

(65) Prior Publication Data

US 2016/0138893 A1 May 19, 2016

Related U.S. Application Data

(63) Continuation-in-part of application No. 13/069,313, filed on Mar. 22, 2011, now Pat. No. 8,686,325.

(60) Provisional application No. 61/316,348, filed on Mar. 22, 2010.

(51) Int. Cl.
| | |
|---|---|
| *F41G 7/30* | (2006.01) |
| *F42B 15/01* | (2006.01) |
| *G06T 7/00* | (2006.01) |
| *G05D 1/12* | (2006.01) |
| *F41G 7/00* | (2006.01) |
| *F42B 15/00* | (2006.01) |

(52) U.S. Cl.
CPC ................ *F41G 7/30* (2013.01); *F42B 15/01* (2013.01); *G05D 1/12* (2013.01); *G06T 7/0042* (2013.01); *G06T 2207/20101* (2013.01)

(58) Field of Classification Search
CPC .............. F41G 7/20; F41G 7/30; F41G 3/14; F41G 3/142; F41G 7/301; F41G 7/303; F41G 7/305; F42B 15/01; F42B 10/32; F42B 10/48; F42B 10/56; F42B 12/02; F42B 12/36; F42B 12/365; F42B 15/02; G05D 1/12; G05D 1/0011; G05D 1/0038; G06T 7/004; G06T 7/0042; G06T 2207/20; G06T 2207/20092; G06T 2207/20101; F42C 13/02; H04N 5/222; H04N 5/225; H04N 5/2251; B64C 29/0008; B64C 29/0016; B64C 29/0033; B64D 17/80

See application file for complete search history.

(56) References Cited

U.S. PATENT DOCUMENTS

| | | | | |
|---|---|---|---|---|
| 3,246,864 | A * | 4/1966 | Mack ................. | B64C 29/0033 102/339 |
| 3,557,304 | A * | 1/1971 | Rue ...................... | G05D 1/0038 244/3.14 |
| 3,564,134 | A * | 2/1971 | Rue ...................... | G05D 1/0038 244/190 |
| 3,567,163 | A * | 3/1971 | Kepp ..................... | F41G 7/303 244/3.14 |
| 3,613,617 | A * | 10/1971 | Hamilton ............... | F42B 15/22 102/390 |
| 3,724,373 | A * | 4/1973 | Rivenes ................. | F42B 10/56 102/387 |
| 3,749,333 | A * | 7/1973 | Lykken .................. | F42B 15/01 244/3.15 |

(Continued)

FOREIGN PATENT DOCUMENTS

GB        2302224 A  *  1/1997  ............. F41G 7/305

*Primary Examiner* — Bernarr Gregory

(57) ABSTRACT

A method for guiding a gun-fired or mortared round towards an intended target. The method including: capturing image data from an image pick-up device during a descent of the round; transmitting the image data to a control platform remotely located from the round; receiving the image date at the control platform; displaying the image data to a user at the control platform; manually identifying one or more features in the image data on the monitor; and stabilizing the image on the monitor based on the one or more identified features.

7 Claims, 2 Drawing Sheets

(56) References Cited

U.S. PATENT DOCUMENTS

| | | | | |
|---|---|---|---|---|
| 3,778,007 A * | 12/1973 | Kearney, II | ............... | F41G 7/30 244/3.14 |
| 3,867,893 A * | 2/1975 | Saholt | ..................... | F42B 15/22 102/378 |
| 3,962,537 A * | 6/1976 | Kearns | ................. | F42B 12/365 244/3.14 |
| 4,226,185 A * | 10/1980 | Tobler | .................... | F42B 10/56 102/340 |
| 4,267,562 A * | 5/1981 | Raimondi | ............ | F42B 12/365 348/144 |
| 4,290,364 A * | 9/1981 | Weidenhagen | ....... | F42B 12/365 102/384 |
| 4,622,900 A * | 11/1986 | Witt | ........................ | F42B 10/48 102/211 |
| 4,711,178 A * | 12/1987 | Argyrakis | ............... | F42B 10/56 102/384 |
| 5,111,748 A * | 5/1992 | Thurner | ................. | F42B 10/56 102/387 |
| 5,339,742 A * | 8/1994 | Hulderman | ............ | F42C 13/02 102/213 |
| 5,467,681 A * | 11/1995 | Liberman | ............... | F42B 10/56 244/3.1 |
| 5,668,346 A * | 9/1997 | Kunz | ..................... | F42B 10/56 102/211 |
| 6,037,899 A * | 3/2000 | Weber | .................... | F42G 3/142 244/3.2 |
| 6,471,160 B2 * | 10/2002 | Grieser | ................. | B64D 17/80 244/138 R |
| 6,924,838 B1 * | 8/2005 | Nieves | ................ | H04N 5/2251 348/143 |
| 6,978,717 B1 * | 12/2005 | Hambric | ............... | F42B 12/365 102/473 |
| 7,679,037 B2 * | 3/2010 | Eden | .................... | F42B 12/365 244/1 R |
| 7,834,300 B2 * | 11/2010 | Zemany | ................. | F42B 15/01 102/382 |
| 8,450,668 B2 * | 5/2013 | Maynard | ............... | F42B 15/01 102/382 |
| 8,686,325 B2 * | 4/2014 | Rastegar | .................. | F41G 7/30 102/473 |
| 2004/0196367 A1 * | 10/2004 | Raymond | ............. | F42B 12/365 348/144 |
| 2008/0276821 A1 * | 11/2008 | Stancil | ................. | F42B 12/365 102/502 |

\* cited by examiner

REMOTELY GUIDED GUN-FIRED AND MORTAR ROUNDS

CROSS-REFERENCE TO RELATED APPLICATIONS

This application is a continuation-in-part application of U.S. application Ser. No. 13/069,313, filed on Mar. 22, 2011, now U.S. Pat. No. 8,686,325, which claims benefit to U.S. Provisional Application No. 61/316,348 filed on Mar. 22, 2010, the entire contents of which is incorporated herein by reference.

BACKGROUND OF THE INVENTION

1. Field of the Invention

The present invention relates generally to gun-fired and mortar rounds, and more particularly, to remotely guided gun-fired and mortar rounds.

2. Prior Art

Gun-fired munitions and mortars with certain amount of guidance and control capabilities have been developed. Such munitions use either GPS signal alone or in combination with inertial sensors to arrive at a preprogrammed target position or use radar to close a target intercept guidance and control loop. Such munitions have numerous shortcomings including incapability of having a decision making person in the loop, generally incapable of intercepting moving targets without complex sensory systems, as well as being complex systems to produce and operate and are very costly.

Therefore there is a need for a method of guiding gun-fired and mortar round that incorporate a simple design, that can have a person in the decision loop, is low cost, particularly for mortars for close combat operations that would minimize collateral damage and minimize unexploded ordinances (UXO), and can also relay back information about target intercept or the lack thereof and its intercept position.

SUMMARY OF THE INVENTION

Accordingly, a method for guiding a gun-fired or mortared round towards an intended target is provided. The method comprising: capturing image data from an image pick-up device during a descent of the round; transmitting the image data to a control platform remotely located from the round; receiving the image date at the control platform; displaying the image data to a user at the control platform; manually identifying one or more features in the image data on the monitor; and stabilizing the image on the monitor based on the one or more identified features.

The one or more identified features can include at least one characteristic which makes them easier for pattern recognition algorithms to identify and track. The at least one characteristic can comprise one or more of a sharp contrast region and a sharp edge.

The manually identifying can comprise identifying the one or more features in the image data on the monitor with a pointing device operably connected to the monitor or by touching a corresponding portion of the monitor.

The one or more features in the image data can include the target. The one or more features in the image data does not need to include the target.

The manually identifying and stabilizing steps can be repeated as the gun-fired or mortared round gets closer to the intended target.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

This invention discloses a remotely guided round 100 that may be fired from a gun 102 or a mortar. Once the round 100 is launched, during its initial portion of its flight, such as at its apogee 104, the round is intended to follow its ballistic trajectory, even though the round 100 may also be equipped with post-firing means of propulsion.

Figure 1:
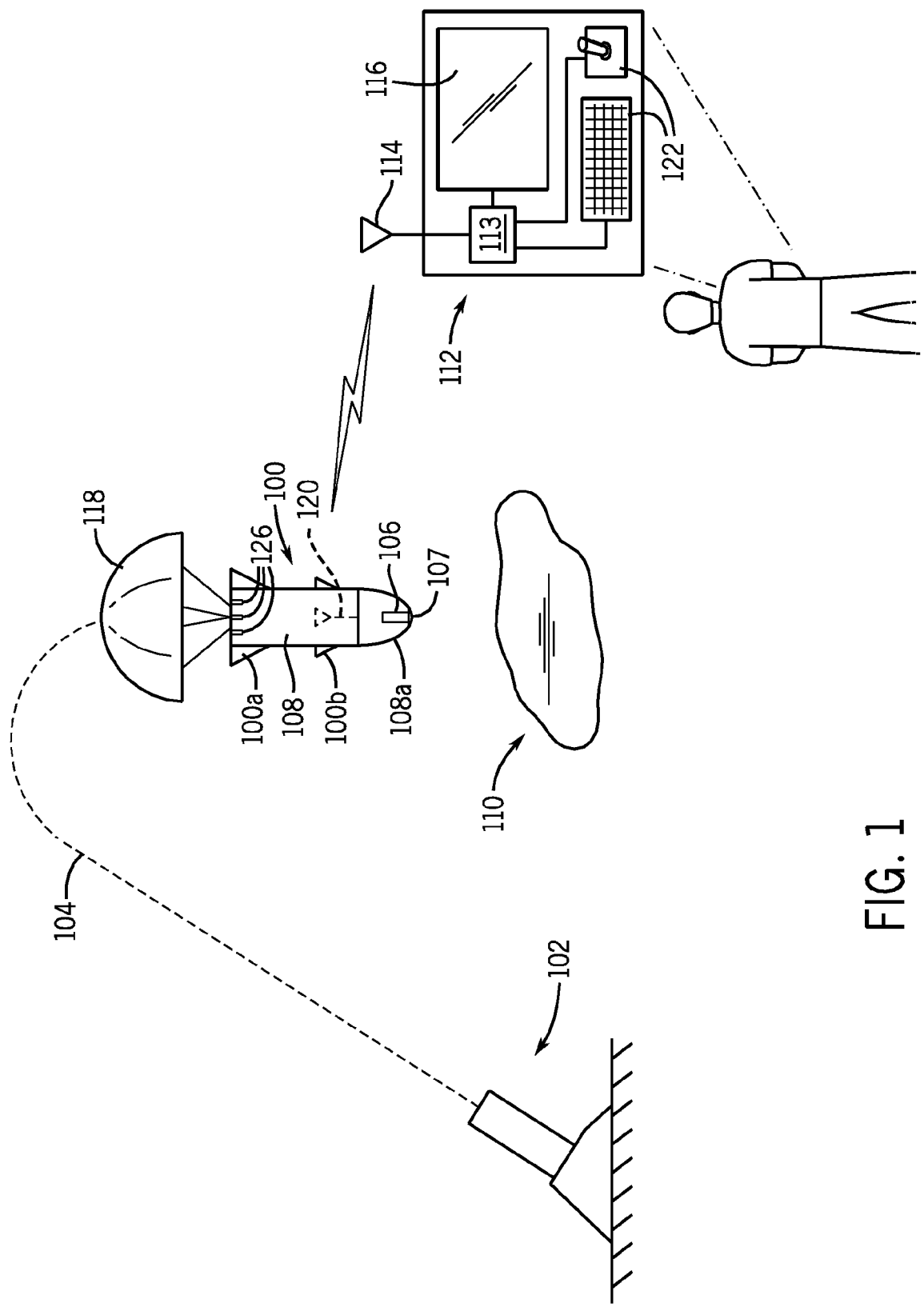
FIG. 1 illustrates a schematic of a system for remotely guiding a round to an intended target.
Figure 2:
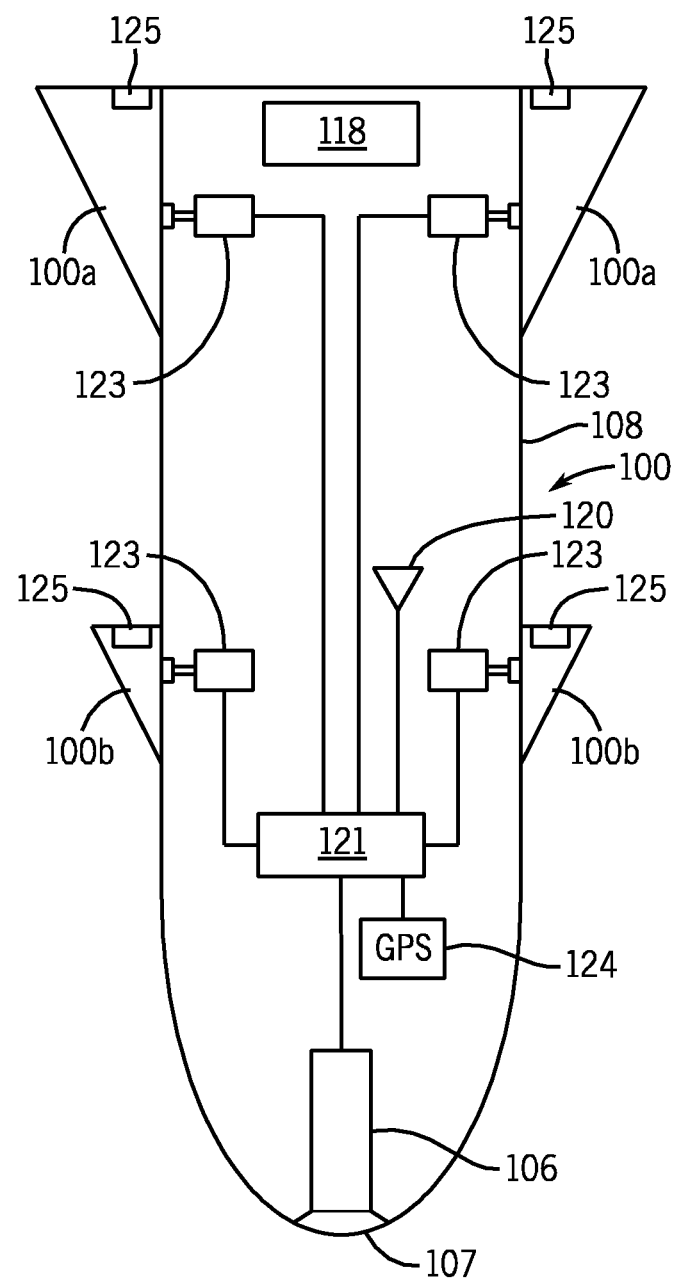
FIG. 2 illustrates a schematic of a round used in the system of FIG. 1.

Referring to FIGS. 1 and 2, the round is provided with at least one substantially forward facing camera 106 (preferably viewing through a transparent portion 107 of the casing 108), which during the descent is directed substantially towards the intended target 110, captures images of the general target area and wirelessly transmits such images to a weapon control platform 112 remotely located from the round 100. The camera 106 can be mounted at or near the nose area 108a of the round. The image(s) is/are transmitted from the onboard camera 106 to the weapon control platform 112 via a secure two-way radio link by any means known in the art, such as by RF signal. The signal can be directly detected at a transceiver 114 at the remote weapon control platform 112 or through an intermediate receiver/transmitter, such as a satellite or nearby UAV(s).

The onboard camera 106 can be black and white to reduce the amount of data that needs to be transmitted, thereby increasing the rate at which the image can be refreshed. In certain applications, however, full or partial color may be preferable. In another embodiment, infra-red sensitive cameras can be used to enable night imaging capability. Alternatively, cameras sensitive to both infra-red and daylight (e.g., multi-pixel type) could be used.

At the weapon platform 112, the image(s) transmitted by the transceiver 120 on board the round 100 are received by the transceiver 114 at the weapon platform 112 and can be displayed on a monitor 116 for the operator to view. The monitor 116 can be mounted on a "fire control" console used by the operator for weapon guidance and control purposes, the mode of operation of which is described below.

Following launch and at some point in its trajectory, such as up to apogee 104, the round 100 is intended to follow its ballistic trajectory. The round 100 is provided with large enough fins (fixed or deployable) 100a so that during its descent (flight past the apogee), its nose 108a is pointing downwards towards the earth/target. The round 100 may be provided with a means to slow down its rate of descent. One such means is a parachute 118 that can be deployed once the round has passed apogee 104. Other means for slowing descent include a "propeller" shaped element that is positioned at or near the tail of the round. In one embodiment, the "propeller" is attached to the housing of the round near the tail (fins) via bearings that allow it to rotate about the long axis of the round. Alternatively, the "propeller" is fixed to the housing of the round. In another embodiment, the "propeller" also serves as the round fin, since the drag that it produces serves the same function as the fins to stabilize the round during its flight. In yet another embodiment, two such rotating propellers can be used as previously described, such as being mounted on bearings on the same shaft, but are designed to rotate in the opposite direction as the round descends. By having two identical propellers (in size and the air displacement/drag producing characteristics) but rotating in opposite directions, the net torque acting on the round about its long axis which would tend to cause the round to spin is thereby minimized. Other means for slowing the descent include deployable surfaces which increase the drag of the round Furthermore, the rate of descent can be variable, such as by simply jettisoning the parachute 118 or a portion thereof. Where the operator has the round directed to the target, the operator may choose to jettison the parachute 118 to increase the rate of descent. Means for jettisoning parachutes and the like are well known in the art, such as with explosive fasteners 126.

During the descent, if the round 100 has been fired in the general direction of the target 110 and if the target 100 is in the field of view of the camera 106, the weapon system operator can view the target 106 on the fire control system monitor 116.

The round 100 can also be provided with means to actively control its trajectory, preferably by providing flight control surfaces such as controllable fins 100a or canards 100b. The control surfaces can be actuated by onboard control microprocessor and related electronics (collectively referred to as an on-board microprocessor and by reference numeral 121) using electrical motors or actuation devices (generally referred to by reference numeral 123) that consume very low electrical energy such as those disclosed in U.S. patent application Ser. No. 12/217,605, now U.S. Pat. No. 8,110,785, (U.S. Publication No. 2010/0275805) and Ser. No. 12/217,604, now U.S. Pat. No. 8,193,754, (U.S. Publication No. 2010/0275595) both filed on Jul. 7, 2008, the contents of each of which are incorporated herein by reference.

In an embodiment, the guidance and control system of the disclosed weapon system operates as follows. During the descent, the operator observes the intended target 110 on the fire control system monitor 116. In this control system, the camera 106 acts as the sensor that displays the position of the target 110 relative to the round 100 in the field of view of the camera 106. The control system console 112 is also provided with an input means 122, such as a keyboard or joystick that by, e.g., moving it to the right and left or up and down, a signal is transmitted to the round's onboard microprocessor 121 to actuate the control surfaces (100a, 100b) to guide (divert) the round 100 to the right or left and/or up or down as referenced in the view observed in the fire control system monitor 116. This process will then continue until the target 110 is intercepted. In such a system, the operator may also provide a signal to arm the round 100, e.g., by pressing a button on the joystick, keyboard or the like. By providing such a feature, the operator has the option of not arming the round 100 if it is determined that there is no target of interest in the field of view of the weapon or if the weapon has been fired towards an unintended site or for any other relevant reason. Alternatively, the round 100 may be armed (upon firing or during the flight and a relatively significant distance from the target), and the operator can have the option of disarming the round 100 if it is determined that there is no target of interest in the field of view of the weapon or if the weapon has been fired towards an unintended site or for any other relevant reason. The operator can also arm the round at certain time and disarm it at a later time, e.g., prior to impact with the target 110. The weapon control platform 112 includes a controller/processor and associated electronics (collectively referred to as a controller and by reference numeral 113) for controlling/coordinating the operation of its constituent features (e.g., monitor 116, transceiver 114 and input means 122).

In such a system, the onboard camera 106 together with the weapon system operator acts as an inexpensive "homing sensor" for the round guidance and control system.

It is noted that the use of control surfaces such as fins and canards for guidance is well known in the art and are commonly used in gun-fired projectiles and missiles. In addition or in place of such control surfaces, thrusters may be used to guide the round, such as the chemical thrusters 125 disclosed in U.S. Pat. No. 7,800,031 and U.S. patent application Ser. No. 12/877,075 filed Sep. 7, 2009, the contents of each of which are incorporated herein by reference.

The round can have a minimal rate of spin during the descent so that it is easier for the weapon system operator to correct the trajectory of the round to intercept the target. The weapon control platform 112 can be provided with an image processing algorithm that would allow the image viewed on the monitor 116 to be substantially still rotationally and/or in translation to make it easier for the operator to perform guidance and other control and operational tasks. This would also allow the rate of descent to be selected to be higher, thereby increasing the element of surprise and minimizing the amount of time that the target would have to avoid being intercepted. Image processing algorithm for correcting for spin and translation are well known in the art. Alternatively, control surfaces or thrusters can be used to reduce or even eliminate the spin.

In yet another embodiment, the image received at the fire control system may be used to automatically detect the target using image processing and pattern recognition algorithm by the weapon control platform's controller 113, which could directly send the required guidance and control signals to the round microprocessor 121 until the target is intercepted. Such a process may include intervention of an operator, e.g., to give the go-ahead to the target interception, arm or disarm the warhead or to verify the target or the like.

Alternatively, the operator can mark the target on the display 116 and the controller 113 can automatically guide the round to the target by sending the required guidance and control signals to the round microprocessor 121 until the target is intercepted. As such, the operator can use a pointing device, such as a trackball, mouse, joystick and the like to position a pointer over the intended target and indicate the target by clicking, pushing a button or the like. The controller 113 then automatically guides the round to the target and sends the required guidance and control signals to the round microprocessor 121 until the target is intercepted.

In yet another embodiment, the round can be released from an airborne vehicle such as an UAV or manned airplane or a missile. The round may also be a sub-munition that is released from a cargo round carrying multiple such sub-munitions.

It is appreciated by those familiar with the art that such a round may also be equipped with numerous other sensory devices and seekers to provide more capabilities to the user, such as detection at a distance to the target, which can also be displayed to the operator on the monitor 116. However, in general, each addition of such sensory devices and/or seekers increases the system complexity, requires more electrical power to operate and thereby require larger onboard power sources, and in effect reduce the volume available for weapon lethality.

In yet another embodiment, the round 100 can be provided with a GPS sensor 124 that is used for navigation, guidance and/or control purposes, in addition to the aforementioned camera based guidance and control and in certain situations in place of the aforementioned camera based guidance and control system.

The aforementioned GPS sensor can be used by the round to constantly determine its position relative to the earth and transmit that position back to the fire control system at the weapon control platform 112 or other fire control system(s) in field for fire control purposes such as for target damage assessment. Upon target impact or just prior to target impact, the round could also transmit its impact GPS coordinates, preferably together with its arming status, and a signal indicating detonation and/or impact. The time of the impact can be generally determined by the time of termination of the signal transmission. If the signal continues to be transmitted, then it would be known to the weapon control platform and the operator that the round has not detonated. In either case, if the round detonation confirmation signal has not been received, it would then be known to the fire control system(s) that an unexploded ordinance (UXO) has been generated and where it is located and whether it is armed or disarmed, etc.

The aforementioned transmitted impact GPS coordinates can be used by the weapon control platform to determine if the intended target was hit and if it was not hit, how much correction is to be made to the firing direction. The transmitted impact GPS coordinates can be used to close a feedback loop to provide correction to the gun, mortar, rocket, or the like firing the round. In addition, the aforementioned impact sensory information, such as if a hard or soft target was impacted provide an indication as whether the intended target was hit.

In addition, the personnel monitoring the image viewed on the monitor 116 from the round camera 106 can readily disarm the round if the round does not appear to be heading towards the intended target.

In addition, the operator can provide a GPS coordinate of an intended target to the round and the GPS receiver on board the round can input the round's GPS coordinates to the round's on-board computer to guide the round towards the GPS coordinate of the intended target. In which case, the operator can further override such guidance with the input means 122 while observing the intended target using the camera images.

In an alternative embodiment, the aforementioned second processor of the weapon control platform 112 can be used to run a pattern recognition algorithm to identify certain easy to identify feature(s) and compute features of one or more captured images and displays the feature(s) on the platform monitor. The operator can then mark at least one of such features using a pointing device, such as a trackball, mouse, joystick or the touching of the touch screen or the like. The processor of the weapon control platform 112 can then use the selected feature as a reference for stabilizing the image on the monitor. Such features are in general selected to be simple to identify by the processor algorithm, such as those with very sharp contrast regions and/or sharp edges so that the processor of the weapon control platform 112 can identify and update the image stabilization algorithm at a very high rate. The identified features will then serve as a reference for an image stabilization algorithm of the weapon control platform. In certain cases, particularly when the rate of oscillation and/or spin and/or descent of the round is relatively high, multiple processors and/or graphics processing unit (GPU) may be used to significantly increase the updating rate of the stabilized images and thereby the effectiveness of the overall system.

The operator selected features may or may not be the weapon target. In addition, the operator may keep selecting new features as the weapon approaches the target and more clearly identifiable features become available, one of which may or may not be the target.

Furthermore, the features are generally used for the sole purpose of providing rapidly identifiable features for position and orientation referencing purposes, which the operator may update as the weapon approaches the intended target. In addition, the operator may select a target at any time when the round is closer to the intended target or a target of opportunity.

Once the rapidly identifiable features have been selected by the system operator, the rate of video data transfer between the round and the weapon platform may be significantly reduced and be limited to mostly the areas within which the identified features are located and other regions may then be transmitted at a significantly reduced rate, thereby significantly increasing the image updating rate for image stabilization algorithm and thereby making it significantly more efficient.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for guiding a gun-fired or mortared round towards an intended target, the method comprising:
   capturing image data from an image pick-up device during a descent of the round;
   transmitting the image data to a control platform remotely located from the round;
   receiving the image date at the control platform;
   displaying the image data to a user at the control platform;
   manually identifying one or more features in the image data on the monitor; and
   stabilizing the image on the monitor based on the one or more identified features.

2. The method of claim 1, wherein the one or more identified features include at least one characteristic which makes them easier for pattern recognition algorithms to identify and track.

3. The method of claim 2, wherein the at least one characteristic comprises one or more of a sharp contrast region and a sharp edge.

4. The method of claim 1, wherein the manually identifying comprises identifying the one or more features in the image data on the monitor with a pointing device operably connected to the monitor or by touching a corresponding portion of the monitor.

5. The method of claim 1, wherein the one or more features in the image data includes the target.

6. The method of claim 1, wherein the one or more features in the image data does not include the target.

7. The method of claim 1, wherein the manually identifying and stabilizing steps are repeated as the gun-fired or mortared round gets closer to the intended target.

* * * * *